United States Patent Office 3,814,669
Patented June 4, 1974

3,814,669
DETERMINATION OF GLUTAMIC-OXALACETIC TRANSAMINASE
Harry Goldenberg, Los Angeles, Calif., assignor to The Dow Chemical Company, Midland, Mich.
No Drawing. Continuation of abandoned application Ser. No. 39,501, May 21, 1970. This application Oct. 5, 1972, Ser. No. 295,348
Int. Cl. G01n 31/14
U.S. Cl. 195—103.5 R                                    1 Claim

ABSTRACT OF THE DISCLOSURE

An improved method of determining amounts of the enzyme glutamic-oxalacetic transaminase in body fluids is decribed. The method is based on the reaction between a diazonium salt color developer and oxalacetic acid produced during incubation of the body fluid with a suitable substrate and the comparison of the reciprocal of the depth of color obtained thereby to the reciprocal of the depth of color obtained with a known amount of said enzyme.

CROSS-REFERENCE TO RELATED APPLICATION

This is a continuation of application Ser. No. 39,501, filed May 21, 1970, now abandoned.

BACKGROUND OF THE INVENTION

The present invention is concerned with an improvement in a method of determining the amount of the enzyme glutamic-oxalacetic transaminase in body fluids by a procedure described by Babson, U.S. Pats. Nos. 3,069,-330 and 3,206,376 and Babson et al., Clin. Chim. Acta. 7, 199 (1962).

In the method as described by Babson et al., the amount of the enzyme glutamic oxalacetic transaminase in a body fluid is determined by incubating a small quantity of such fluid with a substrate containing L-aspartic acid and α-ketoglutaric acid under conditions conducive to the production of oxalacetic acid, adding a diazonium salt to the mixture, the diazonium salt being one which couples with oxalacetic acid to provide a colored product, terminating the incubation after a predetermined time period has elapsed, and measuring the depth of the color formed. The depth of color formed is typically measured by employing a colorimeter or similar instrument and is measured in terms of absorbance of the mixture with light having a wavelength of 450–560 millimicrons, depending in part upon the exact procedure and diazonium salt employed.

The amount of enzyme present in the body fluid is typically determined by preparation of a standard curve. The standard curve is obtained by carrying out the above procedure with six enzyme standard compositions each containing a different known quantity of enzyme and plotting the concentration of enzyme against absorbance. The frequent preparation of standard curves for each new lot of substrate or diazonium salt or for each change of instruments or procedure, while time consuming, is necessary in order to obtain reliable results.

In certain cases, the body fluid has an abnormally high absorbance for light of the wavelength employed in measuring depth of color. In such cases (typically involving hemolyzed, icteric or turbid serum) two separate quantities of the body fluid are employed. A first quantity of the fluid is mixed with substrate, incubated, mixed with the diazonium salt and so on according to the exact procedure being employed. The second quantity of fluid is handled in susbtantially the same fashion, however, a control buffer composition containing no L-aspartic acid or α-ketoglutaric acid is employed in place of the substrate. The difference in depth of color observed with the two quantities of fluid is then employed determining the enzyme concentration using the standard curve.

BRIEF SUMMARY OF THE INVENTION

This invention is directed to an improved method for determination of the enzyme glutamic-oxalacetic transaminase in body fluids. More particularly, this invention is directed to an improvement in the method of determining amounts of said enzyme by a procedure involving mixing a small amount of a body fluid with a substrate, incubating the mixture under conditions conducive to production of oxalacetic acid, adding a diazonium salt which forms a colored product with the oxalacetic acid and measuring the depth of the color formed. In particular, the invention is concerned with an improvement in said method in which the steps of the method are carried out to provide a measurable color in the mixture, the reciprocal of the depth of color being directly proportional to the reciprocal of the amount of enzyme present, and to a further procedure in which a diazonium salt is mixed with a substrate and a small amount of a bodily fluid of abnormally high absorbance prior to incubation of the mixture in a manner effective to prevent formation of a clinically significant amount of oxalacetic acid in the mixture during the incubation.

The determination of glutamic-oxalacetic transaminase in body fluids utilizing enzyme-catalyzed production of oxalacetic acid and colorimetric assay of oxalacetic acid utilizing the reaction of oxalacetic acid with a diazonium salt is old and well known. Suitable substrate compositions, incubation conditions, incubation times and methods for terminating incubation, as well as suitable diazonium salts and color developer compositions are well known, being described, for example, in U.S. Pats. Nos. 3,069,330 and 3,206,376, and by Babson et al., Clin. Chim. Acta 7, 199 (1962) and by Sax and Moore, Clinical Chemistry, 13, 175 (1967). The depth of color produced is not a strictly linear function of the concentration of oxalacetate in the mixture over concentration ranges typically encountered and conditions typically employed for the determination. Also, the production of oxalacetic acid in the mixture is not a strictly linear function of the amount of glutamic-oxalacetic transaminase present. As a result, determination of the enzyme by simple direct comparison with a single enzyme standard composition containing a known amount of enzyme has not been possible. It has been customary, instead, to employ a plurality of enzyme standards to prepare a standard curve for interpolation of results.

It has now been found that the determination of glutamic-oxalacetic transaminase can be carried out by the use of a single enzyme standard composition and without the use of a plurality of standards or a standard curve. In the improved procedure of the invention the steps of mixing body fluid and substrate, incubating the mixture, adding the diazonium salt, terminating the incubation, etc. are carried out under substantially the same conditions as heretofore employed, however, the procedure is carried out so that the reciprocal of the depth of color obtained is directly proportional to the reciprocal of the amount of enzyme present. Although the depth of color or absorbance measured in the improved method of the invention is not directly proportional to the amount of enzyme present, the invention eliminates the need for employing more than one enzyme standard composition with each lot of substrate or color developer. There is no need for preparation of a standard curve, and the amount of enzyme present in a given sample of body fluid can be determined directly by comparison of the reciprocal of the absorbances obtained with the sample and with a single enzyme standard composition.

The method of the invention is carried out by mixing a minor amount of a body fluid such as serum with a substrate containing α-ketoglutaric acid and L-aspartic acid and a buffer adapted to maintain the pH of the mixture between about 6.5 and 8 and preferably between about 7.3 and 7.5. The substrate can also contain sequestering agents and protective colloids. The mixture is incubated at a temperature of from about 35° C. to about 40° C. for from about 15 to about 25 minutes, after which an excess of a color-forming diazonium salt is added, and the incubation is continued for a short period of time, generally from about 5 to about 15 minutes. The incubation can be terminated by conventional procedures such as by cooling the mixture to a temperature of about 10° to 15° C. or by adding acid thereto to reduce the pH of the mixture below the pH range at which the enzyme-catalyzed transamination reaction takes place. For example, the mixture can be acidified to a pH of less than 3 to terminate the enzymatic reaction. The incubation can be terminated at the time of addition of the color-forming diazonium salt by simultaneous acidification. In general, the incubation should be terminated after an incubation time sufficient for the production of a measurable quantity of oxalacetic acid, the incubation time being less than the time required for the production of such inordinately large amounts of oxalacetate that the reciprocal of the depth of color ultimately produced becomes non-linear with respect to the reciprocal of the concentration of enzyme. The incubation time and conditions should be selected so that the enzyme-catalyzed transamination reaction will not proceed beyond 25 to 30 percent completion when the incubation is terminated.

The proportional relationship of the reciprocal of the depth of color and the reciprocal of the amount of enzyme can be expressed as follows:

$$\text{(I)} \qquad \frac{1}{A} = \frac{1}{(GOT)} \cdot \frac{K}{f} + \frac{1}{f}$$

wherein A is the depth of color measured in terms of absorbance, GOT is the amount of glutamic-oxalacetic transaminase and K and $f$ are constants.

The constant factor K may be regarded as a constant which reflects the conditions of the enzymes-substrate incubation (substrate concentration, buffer, pH, temperature and incubation time). The constant factor $f$ reflects the above conditions with the exception of enzyme-substrate incubation time, and also reflects the factors pertaining to oxalacetate measurement, including color developer, vial optics, choice of colorimeter, filter, and incubation time in the presence of the color developer.

It will thus be apparent that once a specific procedure and reagent system are selected, the value of K can be determined by carrying out the procedure with two enzyme standard compositions (or any higher number which may be desired, for example, for statistical analyses), plotting 1/A against 1/(GOT) and determining K and $f$ from the slope and intercept of the plot. Once K has been determined for a given procedure, only one enzyme standard composition need be run with each lot of reagents or each colorimeter. The value of $f$ can be determined with a single enzyme standard by employing Equation II:

$$\text{(II)} \qquad f = \left[\frac{K}{(GOT)_s} + 1\right] \cdot A_s$$

wherein $(GOT)_s$ and $A_s$ are the amount of enzyme in the enzyme standard composition and the absorbance observed in carrying out the procedure. The single determination of $f$ with a single enzyme standard can then be employed in determining the amount of the enzyme glutamic-oxalacetic transaminase in body fluids such as serum or the like by means of comparison of the reciprocal of the absorbance (A) obtained with the body fluid with the reciprocal of the absorbance obtained with the enzyme standard. The comparison can be made by means of tables, graphs or the like or can be carried out by an equation such as Equation I above or Equation III below:

$$\text{(III)} \qquad \left[\frac{A}{f - A}\right] K = (GOT)$$

By utilizing the improved method and comparing reciprocal absorbances, the former requirement of multiple standards and a standard curve can be eliminated. Elimination of the standard curve also serves to reduce the likelihood of errors introduced in constructing the curve and interpolating results therefrom.

DESCRIPTION OF PREFERRED EMBODIMENTS

In a convenient procedure, a substrate composition is prepared and measured into tubes, 0.5 milliliters per tube. The substrate contains 0.02 molar L-aspartic acid, and 0.005 molar α-ketoglutaric acid in an aqueous buffered solution (pH 7.4) including dibasic and monobasic potassium phosphate, buffer, polyvinyl pyrrolidone as a protective colloid and tetrasodium ethylenediamine tetraacetic acid as a sequestering agent. The diazonium salt color developer is employed as an aqueous solution of 6-benzamido-4-methoxy-m-toluidine diazonium chloride (about 0.004 molar). An acid diluent is prepared by dilution of 1.7 milliliters concentrated hydrochloric acid and .5 milliliters of ethoxylated tridecyl alcohol to one liter with distilled water. The substrate, color developer and acid diluent are similar in all respect to those employed in conventional determinations.

In representative operations three tubes A, B, and C are preheated to an incubation temperature of 37° C. 0.1 Milliliter of an enzyme standard composition (Versatol–E) is added to tube A and an identical quantity of body fluid, e.g., serum containing an unknown amount of enzyme is added to tube B. 0.1 Milliliter of distilled water is added to tube C to provide a reagent blank. All three tubes are incubated at 37° C. for 20 minutes after which 0.5 milliliter of the color developer solution is added to each tube and mixed with the contents thereof. The tubes are maintained at the incubation temperature for an additional 10 minutes after which 5 milliliters of the acid diluent are added, lowering the pH to less than pH 3 and terminating the incubation. The absorbence of the contents of the tubes is then measured using a colorimeter, and the depth of color formed in tubes A and B is determined by subtracting the absorbance of the blank tube C.

In previous operations with the above procedure and reagent system, the value of K has been found to be 435. In such operations, the amount of enzyme is expressed in units defined as the amount of enzyme which will form one micromole of oxalacetic acid per minute per liter of serum under the conditions employed. Using the previously determined value of K=435 and setting A and $A_s$ equal to 100 times the absorbance (a conventional expedient for simplifying calculations), the value for the constant factor $f$ is calculated from Equation II above by inserting the value for the absorbance obtained with the enzyme standard composition (tube A). The transaminase activity of the unknown serum sample (tube B) is determined from its absorbance by substituting into Equation III above. Calibration with a single enzyme standard composition, that is, determination of the parameters of the relationship between depth of color and amount of enzyme, need not be repeated until a different batch or lot of color developer is employed, or the color measuring instrument is changed.

Thus in a typical series of operations, the procedure is carried out with a plurality of different serum samples each containing an unknown amount of the enzyme, and the determination of the amount of enzyme present in each sample is carried out by comparing the reciprocal of the depth of color produced with each sample to the reciprocal of the depth of color obtained with the identical single enzyme standard composition. In the above procedure, the value of the constant factor $f$ has been generally found to vary between about 70 and 110 for different batches of color developer using a Diagnostest® Colorimeter. The method gives excellent results with samples containing normal amounts of enzyme (less than about 36 to 40 units) and abnormal amounts up to about 350 units (amount of enzyme which forms 350 micromoles of oxalacetate per minute per liter under the test conditions employed).

With the above-described procedure, a further modification can be employed when it is desired to determine the amount of glutamic-oxalacetic transaminase in a body fluid having an abnormally high absorbance, such as turbid, icteric or hemolyzed serum. It has been found that when the preferred diazonium salt color developer (6-benzamido-4-methoxy-m-toluidine diazonium chloride) is mixed with the substrate prior to addition of the abnormal serum, and thus prior to incubation, no clinically significant amount of additional color (corresponding to oxalacetic acid) is formed after incubation. The ultimate mixture prepared by the modified procedure can thus be employed as a serum blank. In such cases the amount of enzyme can be determined from the reciprocal of the difference between depth of color formed in the further modified procedure and the depth of color formed when the incubation is carried out prior to addition of the color developer. The amount of color developer added prior to addition of the body fluid should be identical to that normally added after incubation in the first above-described procedure, and the procedure should be otherwise identical to that described above. Such amount is selected so as to provide an excess of the diazonium salt over the oxalacetic acid which could be formed during the incubation, and thus generally provides an excess of diazonium salt over the amount of $\alpha$-ketoglutarate supplied in the substrate.

In a preferred procedure, the color developer employed is aqueous 6-benzamido-4-methoxy-m-toluidine diazonium chloride at a concentration of about 4 milligrams or more per milliliter. Two tubes containing substrate are handled in a procedure identical to that described above, with the exception that the color developer is mixed with the substrate in one of the tubes prior to addition of the body fluid thereto, and the further exception that the reciprocal of the difference in absorbance measured in the two tubes is compared with the reciprocal of the absorbance measured with an enzyme standard composition.

The further modified procedure eliminates the need for a control buffer composition or the like which has been typically employed when the sample to be determined is turbid, icteric or hemolyzed serum.

What is claimed is:

1. In a method for determining the concentration in a body fluid of the enzyme glutamic-oxalacetic transaminase which comprises mixing a small volume of body fluid with a substrate comprising L-aspartic acid, $\alpha$-ketoglutaric acid and a buffer adapted to maintain the pH in the mixture between about 6.5 and about 8; incubating the mixture under conditions conducive to the formation of glutamic acid and oxalacetic acid therein for a time sufficient for the formation of a measurable amount of oxalacetic acid therein; thereafter adding a diazonium salt adapted to couple with oxalacetic acid to form a visible color with a depth corresponding to the amount of oxalacetic acid produced by said enzyme in the body fluid; terminating the incubation after a predetermined incubation time in a manner effective to inhibit the production of further quantities of oxalacetic acid in the mixture; and measuring the depth of color formed in said mixture; the improvement which comprises:

(a) carrying out the steps of incubating with a plurality of enzyme standard compositions containing known quantities of said enzyme and terminating the incubation after a predetermined incubation time sufficient for the production of an amount of oxalacetic acid which provides, on addition of the diazonium salt, a measurable color, the reciprocal of the depth of which is proportional to the reciprocal of the amount of said enzyme in the body fluid, said incubation time being less than is required for the production of an amount of oxalacetic acid which provides, on addition of said diazonium salt, a depth of color, the reciprocal of which is not proportional to the reciprocal of the amount of said enzyme;

(b) measuring the depth of color formed by measuring absorbences of said enzyme standard compositions;

(c) determining factors K and $f$ from the proportional relationship of the reciprocal of absorbance (1/A) to the reciprocal of the amount of the enzyme (1/GOT), according to the equation $$\frac{1}{A} = \frac{1}{(GOT)} \cdot \frac{K}{f} + \frac{1}{f}$$

wherein $f$ is determinable from the 1/A intercept of a plot of 1/A against 1/(GOT) and K is determinable from the $f$ and the slope of said plot;

(d) carrying out the steps (a) and (b) of mixing, incubating, adding a diazonium salt, terminating the incubation, and measuring depth of color with the body fluid and with a single enzyme standard composition containing a known predetermined amount of said enzyme;

(e) redetermining the factor $f$ according to said equation from the absorbance measurement obtained with said single enzyme standard, the known amount of enzyme in said standard and the previously determined value of the factor K; and (f) determining the concentration of said enzyme in said body fluid according to said formula from the absorbance measurement obtained with the body fluid, the known amount of enzyme in said standard, the previously determined value of the factor K, and the value of the factor $f$ determined in step (e).

References Cited

UNITED STATES PATENTS 3,069,330    12/1962    Babson _____ 195—103.5 R

ALVIN E. TANENHOLTZ, Primary Examiner